3,035,933
PROCESS OF PRINTING ON POLYOLEFIN SURFACE AND RESULTANT ARTICLE
Paul F. Warner, Phillips, Tex., assignor to Phillips Petroleum Company, a corporation of Delaware
No Drawing. Filed Jan. 27, 1958, Ser. No. 711,138
9 Claims. (Cl. 117—15)

This invention relates to a method of printing on the surface of polyolefin structures. In another aspect it relates to a polyolefin structure bearing an ink film adhering to the surface thereof as an article of manufacture. In still another aspect this invention relates to an improved printing ink which can be employed on the surfaces of solid but flexible polyolefin structures.

Polyethylene and other solid polymers of mono-1-olefins possess surface characteristics which make it quite difficult to apply printing or decorative inks or paints which will adhere to the surface of the polymer. Solid polymers of this type are fabricated into forms such as sheet, film, flexible bottles, food containers, and the like, on which it is desirable to apply identifying or decorative inks which will resist abrasion and yet maintain sufficient flexibility so that the ink film will not crack or flake off when the polymer structure itself is flexed. It is further desirable to develop printing inks which are hard, non-tacky and possess an attractive, glossy appearance. It has been suggested that inks be prepared by dissolving therein a small amount of olefin polymer in order to improve adherence characteristics. This approach is, however, unsatisfactory, particularly for highly crystalline and high softening linear olefin polymers such as low pressure polyethylene, because the viscosity of solutions of such a polymer, even at low concentration, is quite high and methods by which the ink can be applied are limited.

I have found that it is possible to print on solid structures of polyolefin by employing as an ink a composition comprising coloring matter which can be either a pigment, dye, or lake, and a liquid polymer of a conjugated diene having from 4 to 8, inclusive, carbon atoms. Such a liquid polymer can possess a viscosity over a very broad range since it can be readily thinned with miscible solvents which evaporate as the ink dries and the polymer cures. Improved adherence characteristics are obtained when the surface of the olefin polymer is slightly oxidized, as by flame treatment or contact with chemical reagents, prior to application of the ink. The ink thus applied, when dried in the presence of air, cures to an adherent, flexible film which, in combination with the polyolefin structure, forms a valuable article of manufacture. I have found that especially good characteristics of curing plus improved adherence and flexibility after curing are obtained with a printing ink comprising compatible coloring matter and a copolymer of a conjugated diene with a heterocyclic nitrogen-base monomer of the pyridine or quinoline series. Especially preferred in this respect is an ink comprising an inorganic pigment with a liquid copolymer of 1,3-butadiene and 2-methyl-5-vinylpyridine in which the copolymer contains between 1 and 30 weight percent combined methylvinylpyridine and possesses a viscosity in the range of about 500 to 70,000 Saybolt Furol seconds at 100° F. I have also discovered that it is possible to print successfully on a polyolefin surface by applying the conjugated diene liquid polymer and ink sequentially. In this variation of my invention a thin film of the liquid polymer is applied to the polyolefin surface and air dried. Conventional inks applied to this film will adhere tenaciously, even with repeated flexing.

It is an object of my invention to provide an improved method for printing on the surface of a structure of solid olefin polymer.

It is another object of my invention to provide as an improved article of manufacture a solid structure of a polymer of mono-1-olefins containing a printing ink adhering to the surface thereof.

It is another object to provide an improved printing ink which is suitable for application to flexible structures of solid olefin polymers.

A still further object is to provide a printing ink with improved adherence and flexibility characteristics for application to highly crystalline, high density polyethylene.

Other objects, advantages and features will be apparent to those skilled in the art from the following description, examples and claims.

The olefin polymers to which my invention applies and which present the problem of adherence of printing inks to their surfaces are solid polymers of mono-1-olefins containing up to and including 8 carbon atoms per molecule in which no chain branching is present nearer the double bond than the 4-position. Such monoolefins include ethylene, propylene, 1-butene, 1-pentene, 1-octene, and the like, and can be polymerized to solid, resinous products according to the process described in the copending U.S. patent application of Hogan and Banks, Serial No. 573,877, filed March 26, 1956, now U.S. Patent 2,825,721. While my invention can be practiced with solid polymers of these 1-olefins as broadly defined, I prefer to employ ethylene polymers. By "ethylene polymers" I mean to include both homopolymers of ethylene and a preferred group of copolymers of ethylene with up to about 30 weight percent of monoolefins selected from the group consisting of propylene, 1-butene, and 2-butene. While any process which will produce solid olefin polymers of this type can be employed, my invention is of particular importance when dealing with highly crystalline, linear ethylene polymers which are produced by low pressure processes, preferably as described in the above mentioned copending application of Hogan and Banks. These polymers can be characterized by a density of at least 0.94 and preferably at least 0.95 at 25° C. and a crystallinity of at least 70 percent, preferably at least 80 percent, and more desirably at least 90 percent at 25° C. as determined by measurements of nuclear magnetic resonance using a sample of polymer which is in a state approaching equilibrium at 25° C. (Wilson and Pake, Journal of Polymer Science, 10, 503 [1953].) Generally, the softening point of such a polymer is above 240° F., increasing as the density and crystallinity of the polymer increases to within a range of from 250 to 300° F.

The ethylene polymer can be produced in accordance with the Hogan and Banks process by contacting ethylene, with or without a comonomer, with a catalyst comprising as an essential active ingredient chromium oxide, preferably including a substantial amount of hexavalent chromium. The chromium oxide is ordinarily associated with at least one other oxide from the group consisting of silica, alumina, zirconia or thoria. The temperature of the reaction is in the range of about 100 to 500° F. and the pressure is generally between 200 and 700 pounds per square inch absolute. The polymerization can be conducted in either a vapor or liquid phase and when a liquid diluent is employed, the pressure is sufficient to maintain the diluent and a substantial portion of the monomer system in the liquid phase.

Suitable ethylene polymers can also be obtained by processes disclosed by J. A. Reid in copending U.S. patent application, Serial No. 494,281, filed March 14, 1955, and by H. D. Lyons and Gene Nowlin in copending U.S. patent application, Serial No. 495,054, filed March 17, 1955, now abandoned. As disclosed in the first of these patent applications, a solid ethylene polymer can be produced by contacting ethylene with a catalyst comprising a mixture of an organometallic compound, such as aluminum trialkyl, and a halide of a metal of group IV of the periodic table, such as titanium tetrachloride. As disclosed in the latter of these applications, an ethylene polymer can be obtained by contacting ethylene with a catalyst comprising an organometallic halide, such as ethylaluminum dichloride, and a halide of a group IV metal, such as titanium tetrachloride.

Printing inks of my invention can also be applied advantageously to polyethylene prepared by conventional high pressure methods which are well-known in the art.

The polymer which is employed in the ink composition of my invention, is a liquid polymer of a monomer system in which the major component is a conjugated diene having from 4 to 8, preferably 4 to 6, inclusive, carbon atoms per molecule. Examples of such conjugated dienes are 1,3-butadiene, isoprene, piperylene, methylpentadiene, 2,3-dimethyl-1,3-butadiene, 2,3-diethyl-1,3-butadiene, and the like. The liquid polymer can be a homopolymer of such a conjugated diene, copolymers of mixtures of conjugated dienes, or copolymers of conjugated dienes with one or more other unsaturated compounds copolymerizable therewith and containing an active $CH_2=C<$ group. When such copolymers are prepared, it is preferred that at least 70 percent of the copolymer be formed from the conjugated diene. Suitable polymers can be prepared from monomer systems containing 60 to 100 parts by weight of conjugated dienes and up to 40 parts by weight of comonomer. Examples of monomers which are copolymerizable with the conjugated dienes include such materials as styrene, alpha methylstyrene, alpha-methyl-para-methylstyrene, halogenated styrenes such as 2-chlorostyrene and 3-bromostyrene, acrylonitrile, methacrylonitrile, acrylic- and methacrylic acid esters such as methyl acrylate and methyl methacrylate, and the like. I have found that exceptionally durable printing inks can be prepared by employing as the liquid polymer a copolymer of a conjugated diene as above described with a heterocyclic nitrogen-base monomer of the pyridine or quinoline series. These monomers can be represented by one of the general formulas selected from the group consisting of

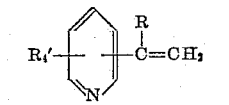

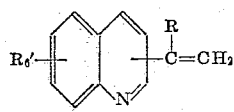

and

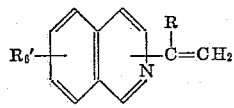

where R is selected from the group consisting of hydrogen and a methyl radical and R' is selected from the group consisting of hydrogen and alkyl radicals having from 1 to 12, inclusive, carbon atoms. Preferred among these comonomers are the alkyl-substituted monovinylpyridines having a total number of carbon atoms of from 8 to 19, inclusive. Examples of the heterocyclic nitrogen-base monomer include 2-vinylpyridine, 2-methyl-5-vinylpyridine, 5-methyl-2-vinylpyridine, 3-ethyl-5-vinylpyridine; 5-ethyl-2-vinylpyridine; 4-methyl-3-vinyl-pyridine; 2,3,4-trimethyl-5-vinylpyrodine; 2-isopropenylpyridine; 5-propyl-2-isopropenylpyridine; 2-octyl-5-vinylpyridine; 5-dodecyl-2-vinylpyridine; 2-vinylquinoline; 8-ethyl-2-vinylquinoline; 4-hexyl-5-vinylquinoline; 1-vinylisoquinoline; 5-methyl-1-isopropenylisoquinoline; and the like.

The liquid conjugated diene polymers can be prepared by any of the methods described in the prior art but are preferably prepared by the process described by U.S. Patent 2,631,175, issued March 10, 1953, to W. W. Crouch. In this polymerization process the monomer system is contacted with a finely divided alkali metal catalyst in the presence of a suitable diluent such as benzene, heptane, or the like, at a polymerization temperature in the range of about 60 to 110° C. The amount of catalyst generally does not exceed 2 parts by weight of alkali metal per 100 parts of total monomer charged to the reactor. The preferred amount of catalyst is in the range of 0.5 to 1.5 parts of weight per 100 parts of monomer. The liquid conjugated diene polymer is recovered by an appropriate treating process wherein the unchanged alkali metals and reactive organometallic compounds are removed or converted to inactive materials. This is generally done first by settling and decantation, filtration, or the like, and treating with an excess of carbon dioxide, or with water followed by carbon dioxide. While the above-described process is preferred, particularly when practiced with a sodium catalyst, because of the substantially colorless product which can be obtained, other methods of producing liquid conjugated diene polymers and copolymers can also be used. The polymers can be prepared by emulsion polymerization using a modifier such as a mercaptan modifier, for example, tertiary dodecyl mercaptan, to promote formation of a liquid product. Other methods for preparing polymers are described in U.S. Patent 2,550,695, issued May 1, 1951, to J. C. Hillyer et al., U.S. Patent 2,514,986, issued July 11, 1950, to F. W. Banes et al., and U.S. Patent 2,264,811, issued December 2, 1941, to H. S. Rothrock.

The liquid conjugated diene polymer which is employed in the printing inks of my invention has a viscosity ranging from 500 to about 70,000 Saybolt Furol seconds at 100° F. The more viscous polymers can be thinned with any suitable solvent such as paraffinic hydrocarbons, for example, pentane, hexane, heptane, and the like; and certain naphtha fractions, preferably having not over 10 carbon atoms per molecule; cycloparaffins, such as cyclohexane; and aromatic hydrocarbons, such as benzene, toluene, and other lower alkyl benzenes, and the like. The amount of thinner employed can vary considerably and is controlled to provide the best printable consistency depending upon the viscosity of the polymer chosen and the amount of pigment or coloring matter employed. The type of printing will also in part determine the amount of thinner used. For example, in silk screen process work a slightly more viscous ink is desirable to lower the tendency of the ink to run. In certain applications it may even be desirable to add a thickener such as a hydrocarbon gelling agent. Any such additives can be employed to vary the viscosity of the ink in order to arrive at an optimum printable consistency without appreciably affecting the bond of the dried ink to the olefin polymer surface.

A wide variety of coloring agents can be employed including inorganic and organic pigments, and oil soluble dyes and lakes, provided, of course, the coloring matter is compatible with the conjugated diene polymer. In general, any organic dye, such as aniline dyes, azo colors, litho reds, triphenylamine derivatives, and the like, which is hydrocarbon soluble and does not bleed out of the cured polymer film, is suitable. The preferred coloring agents are the inorganic pigments which can be easily blended with the liquid polymer by grinding techniques that are standard practice in paint manufacturing. Homogenizers can also be used. Examples of suitable pigments include iron oxide, iron blue pigments, chrome yellow, chromium oxide, titanium dioxide, zinc oxide, white lead, cadmium sulfide, cadmium red pigment, molybdate orange, milori blue, carbon black and ultramarine blue.

The amount of pigment employed in relation to the polymer will depend to a certain extent upon the surface area of the pigment. In general, the amount of pigment can vary from about 5 to 70 weight percent of the ink with the polymer in the range of about 5 to 95 weight percent of the ink. The optimum amount of pigment will depend upon the pigment itself. The maximum amount of carbon black appears to be, in general, about 20 weight percent of the ink while considerably more ultramarine blue, up to about 60 weight percent, can be employed. When higher amounts of these pigments are used, the inks have a tendency to lose some of their glossy appearance. Also, the adherence of the ink to the polyolefin is better when using higher proportions of the liquid polymer. Optimum ranges of pigment for carbon black appear to be, in general, in the range of 10 to 20 weight percent of the ink while for ultramarine blue the optimum range is about 40 to 60 weight percent. Optimum pigment concentrations can readily be determined for other pigments selected to arrive at the desired appearance of the ink and adherence of the ink film to the polyolefin surface.

Improved adherence can be obtained by slightly oxidizing the surface of the polymer prior to application of the ink. Flame treating methods which slightly soften the surface of the polymer without materially heating or deforming the remainder of the polyolefin body can be employed. I have found that oxidizing chemicals can also be employed to treat the surface of the polyolefin instead of the flame treatment. For example, a conventional cleaning solution ($H_2SO_4$—$K_2Cr_2O_7$) can be employed to slightly oxidize the surface of the polyolefin with little danger of affecting the rest of the structure and the adherence of subsequently applied ink is considerably improved.

Various modifiers and plasticizers can be added to the ink compositions to improve the flexibility and durability of the coatings. Drying oil type alkyd resins such as oil modified phthalic alkyd resins are particularly useful in this respect. Such modifiers can be employed in concentrations of from about 2 to 40 weight percent of the total ink composition.

Improved flexibility can be obtained, even without the use of plasticizers, by coating the polyolefin with a very thin film of the liquid polymer and applying a conventional ink after this film is thoroughly dried. The liquid polymer can be applied by dipping, painting or spraying the polyolefin structure with a solution of the polymer in a suitable solvent, such as benzene, normal heptane or the like. A one percent solution of the polymer gives a film of about the right thickness. This concentration can be varied considerably to arrive at a suitable yet economical coating. Driers can be used, but when applying such a thin film the coating will feel dry to the touch as soon as the solvent has evaporated. It is desirable, however, to air dry the coating for several hours, for example 24 hours or longer, in order to completely cure the polymer before applying the ink. The polyolefin may or may not be flame treated prior to applying the polymer film but it is not desirable to flame treat after applying the pre-coat.

The advantages of this invention are illustrated by the following examples. The reactants and their proportions and other specific conditions are presented as being typical and should not be construed to limit the invention unduly.

EXAMPLE I

Liquid copolymers of 1,3-butadiene and 2-methyl-5-vinylpyridine were prepared containing various amounts of combined methylvinylpyridine. The polymers were formed by polymerization in the presence of a hydrocarbon diluent and a finely divided sodium catalyst. Typical reactor conditions were as follows:

Temperature, ° F. _____ 200
Pressure, pounds per square inch gauge _____ 15–35
Diluent monomer ratio, weight basis _____ 60–40
Average residence time, hours _____ 1–2
Sodium, weight percent based on monomers ____ 1–4

The butadiene and methylvinylpyridine were blended in the desired ratio and the mixture was fed to the reactor. In general, higher amounts of sodium catalyst were required for higher contents of methylvinylpyridine. When the reaction had proceeded to the desired degree, the sodium was converted to sodium methylate by contacting the reactor effluent with methanol, then carbon dioxide was passed into the reactor effluent-sodium methylate mixture until it was saturated. The effluent was then washed with water saturated with carbon dioxide. The effluent was then passed through a settler into a centrifuge and the polymer was recovered from the washed effluent by flashing first at atmospheric pressure to remove most of the solvent and then at a pressure of 5 millimeters of mercury at 300° F. to remove the last of the solvent. Specimens of the polymer were blended with various amounts of carbon black or ultramarine blue and normal heptane was employed as a thinner to adjust the viscosity of the ink. The inks were mixed by grinding using a mortar and pestle.

The ultramarine blue was identified as No. 9–4930, marketed by American Cyanamid Corporation. The normal procedure for preparing ultramarine blues is to calcine a mixture of sulfur, silica, clay and soda ash at high temperatures for several hours. The carbon black employed was either (a) a high surface area furnace black or (b) a finely divided medium colored, channel black identified as Monarch 74 manufactured by G. L. Cabot Co.

Several strips of highly crystalline polyethylene prepared by the low pressure process of Hogan et al. described above in the presence of a chromium oxide-containing catalyst were treated by slightly oxidizing the surface, either by flame treating or by contacting with cleaning solution. The flame treating was done by passing the specimen back and forth several times through the flame of a Bunsen burner, taking care not to melt or distort the body of the specimen. Sulphuric acid-potassium dichromate cleaning solution was used for the chemical treatment. Typical properties of the polyethylene employed were as follows:

Density, grams per cubic centimeter at 25° C. ___ 0.96
Softening temperature, ° F. _____ 260
Melt index _____ 0.7
Crystallinity at 25° C., percent _____ 92±1

A mixture of 0.03 weight percent cobalt naphthenate, 0.03 percent manganese naphthenate, and 0.15 percent lead naphthenate, based on the liquid conjugated diene polymer was added to the ink as a drier. The inks were applied to the polyethylene specimens and air dried. The ink compositions and percent methylvinylpyridine in the liquid copolymer are shown in Table I.

Table I

| Specimen No. | Pigment | | Polymer, Weight Percent MVP | n-heptane Thinner, Weight Percent |
|---|---|---|---|---|
| | Name | Weight Percent | | |
| 1 | Furnace Black | 10 | 3.6 | None. |
| 2 | Monarch 74 | 10 | 3.6 | (¹) |
| 3 | Ultramarine Blue | 60 | 3.6 | (¹) |
| 4 | ___do___ | 60 | 12.5 | 25 |
| 5 | Monarch 74 | 10 | 12.5 | 27 |
| 6 | ___do___ | 20 | 27.8 | 53 |
| 7 | ___do___ | 20 | 12.5 | 28 |
| 8 | ___do___ | 10 | 3.6 | (²) |
| 9 ³ | Ultramarine Blue | 60 | 3.6 | (¹) |

¹ In the range of about 25 to 50 weight percent. Exact amount not recorded.
² Carbon tetrachloride used as thinner.
³ One specimen pre-treated with cleaning solution. All others were flame treated.

All of the ink films after drying adhered tenaciously to the polyethylene specimens and could be removed only by scraping with a sharp instrument. Specimens 3 and 9 were exceptionally hard, resisted scratching, had a glossy appearance and were quite flexible. Specimens 4 and 8 were also quite hard, glossy, resisted scratching and did not flake when the polyethylene was flexed. Specimens 5, 6 and 7 possessed somewhat softer ink films which were quite adherent, very flexible, but less glossy than the other specimens. Specimens 1 and 2 were hard, glossy films which adhered to the polyethylene surface but were somewhat less flexible, showing signs of cracking on repeated flexure of the polyethylene strip. The film of specimen 2 was smoother than that of specimen 1.

EXAMPLE II

Liquid copolymer of 1,3-butadiene and 2-methyl-5-vinylpyridine containing 3.6 weight percent combined methylvinylpyridine and having a viscosity of 3,370 centistokes at 100° F. was prepared as described in Example I. A liquid polymer of 1,3-butadiene was also prepared as described in Example I except that the sodium catalyst was removed from the reactor effluent by converting the sodium methylate to sodium sulfate with dilute (1 to 5 percent) sulfuric acid instead of using the carbon dioxide treatment. Inks were prepared from each of these liquid polymers employing ultramarine blue and Ferro yellow by mixing 10 weight percent of pigment with 90 weight percent liquid polymer. The Ferro yellow was a cadmium sulfide pigment identified as No. F-3933, marketed by the Ferro Corporation, Color Division, Cleveland, Ohio. The inks were applied to several bottles of polyethylene of the type employed in Example I and allowed to dry in an air oven at 170° F. for two days. The ink films formed adhered well to the polyethylene surface and the bond could be broken only by scraping into the polyethylene with a sharp instrument. In each case the bottles were flame treated prior to application of the inks.

Drier of approximately 0.015 weight percent cobalt naphthenate, 0.015 weight percent manganese naphthenate and 0.075 weight percent lead naphthenate was added to samples of each ink and these inks were applied with a silk screen to two polyethylene bottles and dried at room temperature. The adherence of both inks to the polyethylene was excellent. Greater flexibility of the ink film containing the butadiene methylvinylpyridine copolymer is characteristic.

EXAMPLE III

Liquid polybutadiene prepared as described in Example II was blended in various amounts with a commercial silk screen process ink (Naz-Dar 5508 Poster Ink). A naphtha thinner was used. Blends were prepared using 25, 50 and 75 weight percent liquid polybutadiene and these inks plus a control containing no polybutadiene were painted on both flame treated and untreated bottles of polyethylene of the type described in Example I. The inks were then dried overnight in an air oven at 180° F. In each case an excellent bond between the polyethylene and the ink was obtained except with those samples that contained no liquid polybutadiene. The quality of the bonds improved as the amount of polybutadiene increased. While the inks formed a fairly good bond to the untreated polyethylene, they adhered quite tenaciously to the flame treated polyethylene. The dried paints also exhibited good lustre.

EXAMPLE IV

Polyethylene of the type used in the previous examples was coated with three liquid polybutadiene inks to which various plasticizers had been added. The liquid polybutadiene was prepared as described in Example II and the coloring material was a commercial ultramarine blue ink manufactured by the Naz-Dar Co. of Chicago, Illinois. The ink compositions were as follows:

*Table II*

| Modifier | Weight Percent | Percent Polybutadiene | Percent Ultramarine blue ink |
|---|---|---|---|
| Syntax 128 [1] | 4 | 36 | 60 |
| Aeroplast 1274 [2] | 4 | 36 | 60 |
| Rubber cement | 33 | 33 | 33 |

[1] A soy oil modified phthallic anhydride resin in mineral spirits, 60 percent solids, manufactured by Jones Dabney Company.
[2] A drying oil type alkyd resin containing phthallic anhydride and about 70 percent drying oil of the linseed or soy oil type. An Archer Daniels product.

All three ink compositions dried to adherent coatings of excellent quality.

EXAMPLE V

A polyethylene bottle of the type used in Example II was flame treated and coated with a one percent solution of liquid polybutadiene in normal heptane. The liquid polybutadiene was prepared as described in Example II. The coating was allowed to air dry for several days. Using a silk screen and the ink employed in Example III, a label was applied to the bottle over the cured polybutadiene film. On drying the label demonstrated good adherence to the bottle and did not crack or peel off on flexing the bottle repeatedly.

As will be evident to those skilled in the art, various modifications of this invention can be made, or followed, in the light of the foregoing disclosure and discussion, without departing from the spirit or scope thereof.

I claim:
1. A method of printing on the surface of a solid resinous polymer of mono-1-olefins containing up to and including 8 carbon atoms per molecule in which no chain branching is present nearer the double bond than the 4-position which comprises applying to said surface an ink comprising coloring agent and a liquid polymer having a viscosity of about 500 to 70,000 SFS at 100° F., and liquid polymer being at least 70 percent formed from a conjugated diolefin having from 4 to 8 carbon atoms per molecule and up to 30 percent from copolymerizable monomers containing an active $CH_2=C<$ group, and said polymer being the immediate product of a polymerization of said diolefins and drying said ink to a solid film on said surface.
2. The method of claim 1 wherein said liquid polymer is a copolymerizate of 1,3-butadiene and an alkyl substituted monovinylpyridine having from 8 to 19 carbon atoms.
3. The method of claim 2 wherein said ink contains 5 to 70 weight percent pigment, 5 to 95 weight percent said liquid copolymer, sufficient organic thinner miscible with said copolymer to give said ink a printable consistency, and a small amount of naphthenate drier.
4. The method of claim 1 wherein said liquid polymer is polybutadiene.
5. As an article of manufacture, a structure of solid resinous polymer of mono-1-olefins containing up to and including 8 carbon atoms per molecule in which no chain branching is present nearer the double bond than the 4-position and decorative matter adhering to the surface thereof, said decorative matter being a dried ink comprising coloring agent and a cured normally liquid polymer which before curing had a viscosity of about 500 to 70,000 SFS at 100° F., said liquid polymer being at least 70 percent formed from a conjugated diolefin having from 4 to 8 carbon atoms per molecule and up to 30 percent from copolymerizable monomers containing an active $CH_2=C<$ group, and said polymer being the immediate product of a polymerization of said diolefins and drying said ink to a solid film on said surface.
6. An article of manufacture according to claim 5 wherein said conjugated diolefin is 1,3-butadiene and said copolymerizable monomer is an alkyl substituted mono- vinylpyridine having from 8 to 19, inclusive, carbon atoms.

7. An article of manufacture according to claim 6 wherein said ink contains 5 to 70 weight percent pigment, 5 to 95 weight percent said liquid copolymer, sufficient organic thinner miscible with said copolymer to give said ink a printable consistency, and a small amount of naphthenate drier.

8. An article of manufacture according to claim 5 wherein said liquid polymer is polybutadiene.

9. A method of printing on the surface of a solid resinous polymer of mono-1-olefins containing up to and including 8 carbon atoms per molecule in which no chain branching is present nearer the double bond than the 4-position which comprises applying to said surface a thin film of a liquid polymer having a viscosity of about 500 to 70,000 SFS at 100° F., said liquid polymer being at least 70 percent formed from a conjugated diolefin having from 4 to 8 carbon atoms per molecule and up to 30 percent from copolymerizable monomers containing an active $CH_2=C<$ group, and said polymer being the immediate produce of a polymerization of said diolefins, drying said film in the presence of oxygen to cure said liquid polymer, and applying ink onto said film thus dried.

References Cited in the file of this patent

UNITED STATES PATENTS

| | | |
|---|---|---|
| 2,458,456 | Wolk | Jan. 4, 1949 |
| 2,639,998 | Pavlic | May 26, 1953 |
| 2,640,042 | Howland et al. | May 26, 1953 |
| 2,652,342 | Gleason | Sept. 15, 1953 |
| 2,668,134 | Horton | Feb. 2, 1954 |
| 2,767,103 | Loukomsky | Oct. 16, 1956 |
| 2,801,446 | Wolinski | Aug. 6, 1957 |
| 2,830,975 | Irvin | Apr. 15, 1958 |
| 2,863,786 | Guth et al. | Dec. 9, 1958 |
| 2,957,786 | Baumhart | Oct. 25, 1960 |

FOREIGN PATENTS

| | | |
|---|---|---|
| 683,209 | Great Britain | Nov. 26, 1952 |

UNITED STATES PATENT OFFICE
CERTIFICATE OF CORRECTION

Patent No. 3,035,933

May 22, 1962

Paul F. Warner

It is hereby certified that error appears in the above numbered patent requiring correction and that the said Letters Patent should read as corrected below.

Column 8, line 39, for "and" read -- said --; column 10, line 1, for "produce" read -- product --.

Signed and sealed this 16th day of October 1962.

(SEAL)
Attest:

ERNEST W. SWIDER
Attesting Officer

DAVID L. LADD
Commissioner of Patents